(12) United States Patent
Heo et al.

(10) Patent No.: US 9,398,406 B2
(45) Date of Patent: Jul. 19, 2016

(54) LOCATION-BASED SERVICE PROVISION METHOD AND SYSTEM OF ELECTRONIC DEVICE

(71) Applicant: Samsung Electronics Co., Ltd., Gyeonggi-do (KR)

(72) Inventors: Changryong Heo, Gyeonggi-do (KR); Kenhyung Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/506,776

(22) Filed: Oct. 6, 2014

(65) Prior Publication Data
US 2015/0099546 A1 Apr. 9, 2015

(30) Foreign Application Priority Data
Oct. 8, 2013 (KR) .......................... 10-2013-0119875

(51) Int. Cl.
| | |
|---|---|
| H04W 4/02 | (2009.01) |
| H04W 52/02 | (2009.01) |
| G01S 19/34 | (2010.01) |
| G01S 19/48 | (2010.01) |
| G06F 21/74 | (2013.01) |
| G06F 21/81 | (2013.01) |

(52) U.S. Cl.
CPC ................. *H04W 4/02* (2013.01); *G01S 19/34* (2013.01); *G01S 19/48* (2013.01); *G06F 21/74* (2013.01); *G06F 21/81* (2013.01); *H04W 52/0209* (2013.01); *G06F 2221/2111* (2013.01); *H04W 4/021* (2013.01); *Y02B 60/50* (2013.01)

(58) Field of Classification Search
CPC .............. H04W 4/02; H04W 52/0209; H04W 52/0274; H04W 52/0254; H04W 8/22; G06F 11/30
USPC ........................... 455/456.3, 456.4, 41.2, 574
See application file for complete search history.

(56) References Cited

U.S. PATENT DOCUMENTS

2013/0324196 A1* 12/2013 Wang ................ H04W 52/0254
455/574

FOREIGN PATENT DOCUMENTS

KR 10-0991629 B1 11/2010

* cited by examiner

*Primary Examiner* — Phuoc H Doan
(74) *Attorney, Agent, or Firm* — Cha & Reiter, LLC

(57) ABSTRACT

A location-based service provision method and system of an electronic device is provided for supporting location-based service even in a sleep mode. The electronic device is provided with a main control unit, a low power sub-control unit, and a sensing unit. The sub-control unit collects sensor information provided by the sensor unit for measuring movement (e.g., speed and direction) of the electronic device, and calculates first location information based on the sensor information. The sub-control unit provides the location-based service based on the first location information.

16 Claims, 6 Drawing Sheets

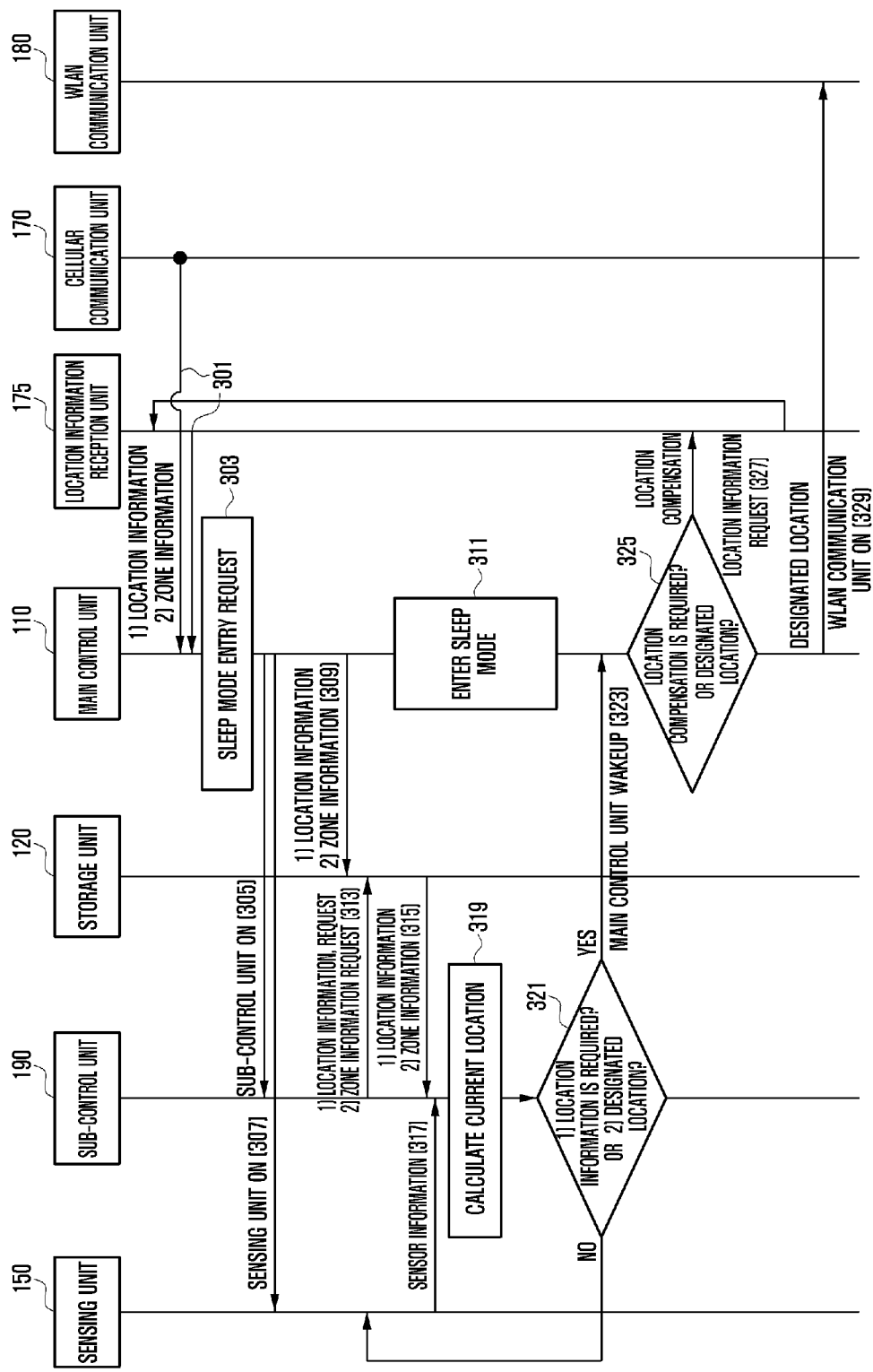

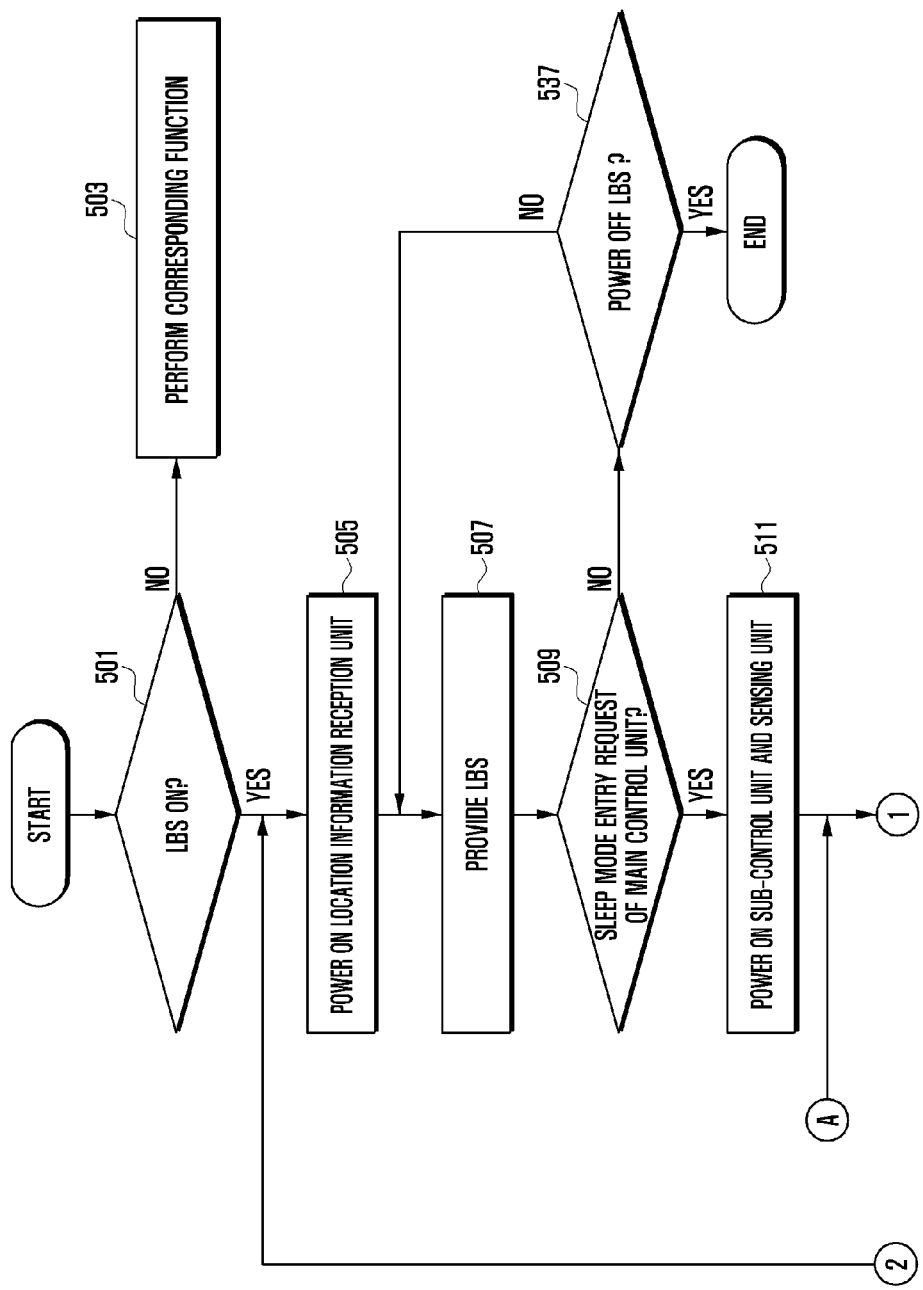

LOCATION-BASED SERVICE PROVISION METHOD AND SYSTEM OF ELECTRONIC DEVICE

CLAIM OF PRIORITY

This application claims the benefit under 35 U.S.C. §119 (a) of a Korean patent application filed on Oct. 8, 2013 in the Korean intellectual property office and assigned serial No. 10-2013-0119875, the entire disclosure of which is hereby incorporated by reference.

TECHNICAL FIELD

This disclosure relates to a location-based service provision method and system of an electronic device.

BACKGROUND

With advances in information communication and semiconductor technologies, the use of electronic devices (e.g. mobile communication terminals) has increased rapidly. Modern electronic devices are designed to provide various functions such as communication, music playback, text messaging, digital broadcast reception, short range radio communication, and Internet access. Portable electronic devices are battery-powered, and power conservation is one of the most important issues in these devices. To conserve power, the portable electronic device operates in a low power mode (interchangeably, "sleep mode") when not in use. The low power (sleep) mode is a state in which minimal power necessary for the electronic device to stay "on" is supplied. Sleep mode can be defined as an inactive state of an electronic device, which is quickly changed to an active mode of the device via detection of a preset input, such as the pressing of a key or button, or receipt of an incoming call or text. For example, in the sleep mode, a mobile communication terminal's display and other functions are powered off, while functions for receiving incoming calls and text messages remain active.

Meanwhile, most recent electronic devices include Location-Based Service (LBS) capability. LBS can be used to provide the user with useful information such as positioning, navigation, and other everyday life information provision service. The latter may inform a user of positions of nearby buildings (e.g. department store, hospital, theater, etc.) based on the location information of the user's device.

In order to provide LBS on a continual basis, conventional devices always maintain an Application Processor (AP) and Global Positioning System (GPS) receiver in active states, or activate them periodically. Since these components consume considerable power, their ongoing use results in significant power consumption by the electronic device. Moreover, in the sleep mode of a conventional electronic device, the AP and GPS receiver are turned off, such that location information is not received and an LBS service is not provided. Thus, at the time the device is awakened, LBS information is inaccurate or unavailable, and this condition remains until updated and accurate GPS information is received and processed. The resulting delay in obtaining accurate LBS information is inconvenient to users.

SUMMARY

Disclosed is an LBS provision method and service of an electronic device that continually provides LBS. The LBS is based on location information acquired by means of a low power sub-processor and sensor.

Also disclosed is an LBS provision method and system that wakes up a main processor to compensate location information and provides notification when the electronic device in the sleep mode fulfils a predetermined condition, e.g. when location compensation is necessary or it enters a designated area.

Further disclosed are an LBS provision method and system capable of supporting a data offloading service in such a way that the electronic device receives zone information including location of a deployed Access Point (AP) and establishes, when it enters the coverage area of the AP in the sleep mode, a data communication channel with the AP.

In one aspect, a location-based service provision method of an electronic device is disclosed, where the electronic device includes a main control unit, a low power sub-control unit, and a sensing unit. The main control unit is operated in at least an active mode of the device. The sub-control unit and the sensing unit are operated in at least a sleep mode of the device. The sub-control unit collects sensor information provided by the sensing unit for measuring movement of the electronic device (e.g., speed and direction). The sub-control unit calculates first location information based on the sensor information, and provides the location-based service based on the calculated first location information.

In accordance with another aspect, an electronic device includes a main control unit which transitions, when a predetermined condition is fulfilled, from an active mode to a sleep mode, a sensing unit which collects sensor information for use in measurement of movement (e.g., speed and direction) of the electronic device in at least the sleep mode of the main control unit, and a low power sub-control unit which calculates first location information based on the collected sensor information and provides a location-based service based on the calculated first location information.

In accordance with still another aspect, a system for providing a location-based service is provided. The system includes a base station which transmits zone information including location information of at least one access point within a service area of the base station, at least one access point deployed within the service area of the base station, and an electronic device which receives the zone information from the base station, calculates first location information by means of a low power sub-control unit based on sensor information collected by a sensing unit, and establishes, when the electronic device enters a service area of the access point, a data communication channel with the access point.

BRIEF DESCRIPTION OF THE DRAWINGS

FIG. 3 is a signal flow diagram illustrating LBS-based data offloading procedure according to an embodiment of the present invention;

FIG. 4A and FIG. 4B are a flowchart illustrating LBS provision method of the electronic device according to an embodiment of the present invention.

DETAILED DESCRIPTION

Exemplary embodiments of the present invention are described with reference to the accompanying drawings in detail. Like reference numbers are used throughout the drawings to refer to the same or like parts. Detailed description of well-known functions and structures incorporated herein may be omitted to avoid obscuring the subject matter of the present invention.

The specification and drawings are to be regarded in an illustrative rather than a restrictive sense in order to help understand the present invention. It is apparent to those skilled in the art that various modifications and changes can be made thereto without departing from the broader spirit and scope of the invention.

In the following description of various embodiments, an electronic device may be (but is not limited to) any of a mobile communication terminal, a smartphone, a tablet Personal Computer (PC), a hand-held PC, a Portable Multimedia Player (PMP), or a Personal Digital Assistant (PDA).

Figure 1:
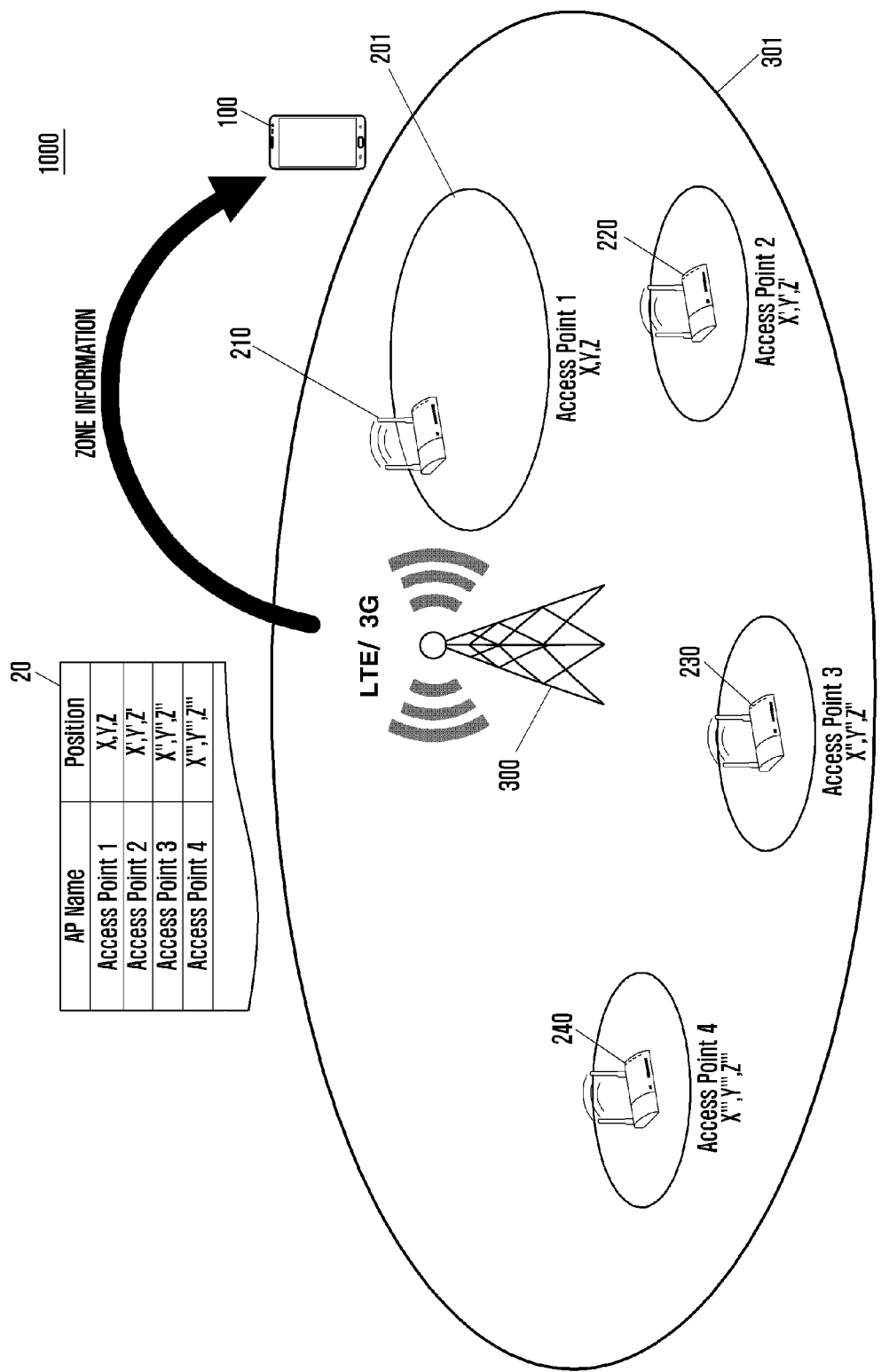
FIG. 1 is a diagram illustrating an exemplary system for providing LBS according to an embodiment of the present invention.

FIG. 1 is a diagram illustrating an exemplary LBS provision system, 1000, for providing LBS according to an embodiment of the present invention. LSB provision system 1000 includes an electronic device 100, a plurality of Access Points (APs) 210, 220, 230, and 240, and a base station 300.

As will be described in detail hereafter, electronic device 100 (hereinafter, "device 100", interchangeably) may enter a service area 301 of the base station 300. At this time, the base station 300 may provide the electronic device 100 with both zone information 20, and traffic channel information. Traffic channel information is information on traffic channel(s) for carrying user data and signaling traffic between the base station and the mobile station (electronic device). Zone information 20 may include respective location information of the APs 210, 220, 230, and 240 located within the service area 301 (e.g., coordinates X, Y, Z of the position of AP 210, etc.).

Device 100 may be equipped with a main processor, e.g. an Application Processor (AP), and a sub-processor. (The main processor and sub-processor may be embodied as a main control unit 110 and sub-control unit 190, respectively, discussed later in reference to FIG. 2.) The main processor may be a high capability high power processor as a device controlling main functions of the electronic device. The sub-processor may be a low capability low power processor. When device 100 enters the sleep mode, the main processor may also be placed in a sleep mode. As noted above, the sleep mode is a power saving mode in which power consuming elements such as the device 100 display are deactivated. When entering the sleep mode, device 100, which has received the zone information 20, may activate the sub-processor along with a sensing unit including a plurality of sensors; and the sub-processor is provided with the zone information 20 as well as the current location of device 100.

After receiving the zone information 20, the sub-processor may generate LBS information and provide LBS using the sensor information collected by the sensors in conjunction with an initially provided current location of device 100 (provided by the main processor upon entry into the sleep mode). For example, device 100 may measure movement direction, movement speed, movement time, and/or movement distance for use in measuring current location. These measurements may be performed by means of an acceleration sensor capable of measuring acceleration, a geomagnetic sensor capable of measuring azimuth, a gyro sensor capable of measuring angular velocity, and/or a barometric sensor capable of measuring altitude. Suitable measurement techniques include Dead-Reckoning (DR), Pedestrian Dead-Reckoning (PDR), and/or Pedestrian Navigation System (PNS) based methods.

If device 100 moves to the service area 201 of the first access point 210, the sub-processor detects this condition through knowledge of the zone information 20 previously obtained. (For example, it may be assumed that entry into a service area occurs when coming within a predetermined distance from an AP's position coordinates X, Y, Z.) The sub-processor then powers on the main processor and a Wireless Local Area Network (WLAN) communication unit. At this time, the main processor may establish a data communication channel with the first access point 210 to perform data offloading. Device 100 may compensate (adjust) the current location information using the location information of the first access point 210.

Afterward, if device 100 moves out of the service area 201, the main processor powers off the WLAN communication unit to conserve power, which may occur during a process of re-entering the sleep mode, or in the active mode. At this time, device 100 may re-establish the data communication channel with the base station 300.

According to various embodiments, the location information may be provided in the sleep mode using the low power sensors and sub-processor. As a consequence, device 100 according to various embodiments of the present invention can continually generate LBS information and provide LBS and an LBS-based offloading function.

Although the above description has been directed to the sleep mode entry of the main processor, the present invention is not limited thereto. For example, in some embodiments, even when the main processor is in the active mode, the sub-processor of device 100 may collect the sensor information by means of the sensing unit to provide the LBS based on the collected sensor information.

Although the above description has been directed to the LBS-based data offloading, the present invention is not limited thereto. For instance, in an embodiment, the LBS can be used to provide shopping information at a shopping mall, department store, wholesale mart, etc. For example, when device 100 enters a shopping mall, an access point installed at the entrance of the shopping mall may send device 100 the access point location information and supplementary information. The supplementary information may include per-floor goods lists and goods' positions information. When the supplementary information is received, device 100 activates the LBS application to compare items in a purchase list stored by the user and the goods in the goods' positions information. An alarm on device 100 may then be sounded when there is any matching item nearby.

Although the above description has been directed to the case where the zone information 20 is received from the base station, the present invention is not limited thereto. For example, zone information may be alternatively or additionally entered by the user. In this case, the zone information may include Point-Of-Interest (POI) information of the user in addition to location information on the access points.

Figure 2:
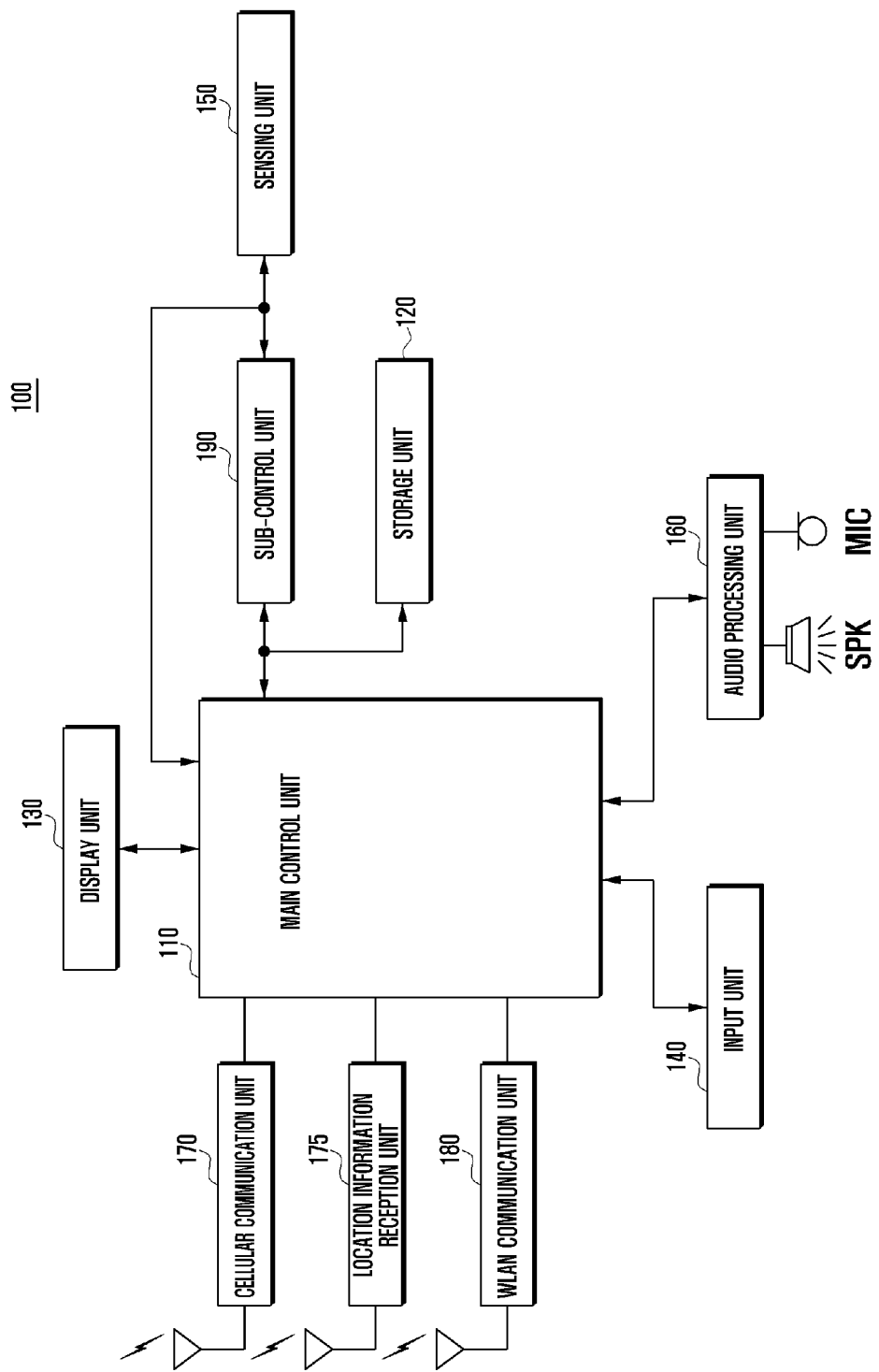
FIG. 2 is a block diagram illustrating a configuration of the electronic device according to an embodiment of the present invention.

FIG. 2 is a block diagram illustrating an example configuration of the electronic device 100 according to an embodiment of the present invention. Device 100 includes a main control unit 110, a sub-control unit 190, a WLAN communication unit 180, a location information reception unit 175, a cellular communication unit 170, an audio processing unit 160, a sensing unit 150, an input unit 140, a display unit 130, and a storage unit 120.

The input unit 140 may include a plurality input keys and function keys for receiving alphanumeric inputs and various function configuration inputs. The function keys may be implemented in the form of navigation keys, side keys, and shortcut keys. The input unit 140 generates key signals associated with the user setting and function control of device 100, and sends to the main control unit 110. The key signals may include power on/off signal, volume control signal, and screen on/off signal. The input unit 140 may be implemented with one or any combination of QWERTY keypad, 3*4 keypad, 4*3 keypad, ball joystick, optical joystick, wheel key, touch key, touch pad, and touchscreen. If device 100 is equipped with a full touchscreen, the input unit 140 may be implemented only with the volume control keys formed at one side of a case of device 100 and include a power key for turn-on/off of the screen and electronic device. The input unit 140 may generate an LBS function on/off signal, and sends to the main control unit 110.

The display unit 130 displays the information input by and provided to the user in addition to various menus of device 100. That is, the display unit 130 may provide various screens, e.g. home screen, menu screen, message composition screen, call processing screen, schedule management screen, phonebook screen, and webpage output screen. The display unit 130 powers off in the sleep mode and powers on when waking up from the sleep mode. According to an embodiment of the present invention, the display unit 130 may display an alarm message notifying the user of the entry to a predetermined area, under the control of the main control unit 110. For instance, in the example outlined earlier, when the user walks in a shopping mall, the display unit 130 may display an alarm message indicating that goods included in a purchase list are located at a current location. The display unit 130 may be implemented with one of Liquid Crystal Display (LCD) and Organic Light Emitting Diodes (OLED). If display unit 130 is implemented in the form of a touchscreen, the display unit 130 may work as a part of the input unit 140.

The WLAN communication unit 180 is responsible for a local area radio communication function with the access point. WLAN communication unit 180 may establish a data communication channel with the access point, receive the zone information from the access point, and receive supplementary information from access points installed at a shopping mall, department store, etc. The supplementary information may include per-floor goods lists and goods' positions information. WLAN communication unit 180 may be a Wi-Fi communication module, but capability for handling other short range communication protocols may be provisioned. WLAN communication unit 180 may be any of various location area radio communication modules capable of establishing a communication channel with the access point.

The location information reception unit 175 may receive the location information of the electronic device. The location information reception unit 175 may include one or more of a Global Positioning System (GPS) module, a triangulation module that uses base station locations to determine device location, and a Wi-Fi Positioning System (WPS) module that determines device location based on the location information of an access point. The location information may include latitude, longitude, and altitude coordinates.

If device 100 enters the sleep mode, the location information reception unit 175 powers off. The location information reception unit 175 may wake up from the sleep mode temporarily in response to a location compensation request. The location compensation request is generated when it is determined that the location information is not accurate. Accuracy of the location information decreases as time elapses and/or the movement distance of the device 100 increases.

The cellular communication unit 170 makes it possible for device 100 to perform voice and data communication on the move. The cellular communication unit 170 may receive the traffic channel information and the zone information from the base station 300. The cellular communication unit 170 may support the $2^{nd}$ generation (e.g. CDMA and GSM), $3^{rd}$ generation (e.g. WCDMA and HSDPA), $4^{th}$ generation (e.g. LTE) data communications, or other protocol-specific communications.

The audio processing unit 160 may include a speaker (SPK) for outputting the audio data exchanged in a call session, included in a received message, and as a consequence of playback of the audio file stored in the storage unit 120; and it includes a microphone (MIC) for collecting user's voice and other sound in the call session. The audio processing unit 160 may output a sound effect alarming a user of an approach to a designated location through the speaker (SPK) under the control of the main control unit 110. In an exemplary case where the user goes to a shopping mall to buy articles, the audio processing unit 160 may output a sound effect alarming the approach to a position where one of the articles included in a purchase list stored in device 100 is located.

The sensing unit 150 obtains sensor information for use in acquiring movement direction, movement time, and movement speed of device 100 and provides the sensor information to the sub-control unit 190. For example, if the LBS function turns on, the sensing unit 150 may collect and send the sensor information to the sub-control unit 190 in the active and sleep modes.

The sensing unit 150 may include an acceleration sensor, a motion sensor, a geomagnetic sensor, a temperature sensor, a humidity sensor, a barometer sensor, a pressure sensor, and/or a gravity sensor. In the embodiment illustrated in FIG. 2, sensing unit 150 is connected to both the sub-control unit 190 and the main control unit 110. In other embodiments, sensing unit 150 may connect to only the sub-control unit 190. According to another embodiment, device 100 may include a switching unit (not shown) for switching the connection of the sensing unit 150 to the sub-control unit 190 in the sleep mode and to the main control unit 110 in the active mode.

The storage unit 120 may store the Operating System (OS) of device 100, application programs necessary for optional functions such as audio playback function, still and motion image playback function, and broadcast playback function, user data, and application data exchanged in the call session. For example, the storage unit 120 may store the video files, game files, music files, and movie files. According to an embodiment of the present invention, the storage unit 120 may store the location information and the zone information. The storage unit 120 also may store the purchase list.

The main control unit 110 processes data and may control the overall operations of device 100 and the signal flows among the components of device 100. For example, the main control unit 110 may be a Central Processing Unit (CPU) or an Application Processor (AP). In general, the main control unit 110 is fully operational in an active mode (i.e., a non-sleep mode) of device 100.

According to an embodiment, the main control unit 110 activates the sub-control unit 190 and the sensing unit 150 and controls the device 100's entry into the sleep mode when a sleep mode entry is requested. It is noted here, when device 100 is said to enter the sleep mode, the main control unit 110 may be considered to enter the sleep mode as well. The main control unit 110 may wake up when the sub-control unit 190 issues a wakeup signal. The main control unit 110 may receive the wakeup signal in the form of an interrupt. (Although the main control unit 110 is in the sleep mode, a low level process may still be running, which is interrupted by the interrupt.) The wakeup signal may be issued when location compensation is requested or device 100 approaches a designated position. The designated position may be a position within an access point service area (i.e., near the access point's coordinates), or at a location where a particular article for sale is located.

If the wakeup signal or interrupt signal requesting location compensation is received, the main control unit 110 activates the location information reception unit 175 to receive and compensate (adjust) the location information. In the case that the wakeup signal or interrupt signal is received in a location within an access point's service area, the main control unit 110 activates the WLAN communication unit 180 and establishes a data communication channel with the access point. In some embodiments, device 100 may support a data offloading function. If device 100 wakes up in the area where the article to purchase is located, the main control unit 110 may output an alarm message or sound effect to indicate a condition approaching the article to purchase.

The sub-control unit 190 may be implemented with a Micro-Processor Unit (MPU) or Micro-Control Unit (MC) as a low power processor. The sub-control unit 190 may be configured with capability of providing LBS function when the main control unit 110 is in both the active and sleep modes. For example, the sub-control unit 190 may provide the LBS function based on the sensor information collected by the sensing unit 150 when the main control unit 110 is in the active mode. The sub-control unit 190 also may provide the LBS function based on the sensor information collected by the sensing unit 150 even when the main control unit 110 is in the sleep mode. As noted earlier, the sub-control unit 190 achieves this functionality by analyzing the collected sensor information to acquire the movement direction, movement time, and movement speed of device 100 and calculates the movement distance based on the movement time and the movement speed. The sub-control unit 190 is capable of calculating the current location by adding the movement direction and movement distance to the previous location information. The current location may include latitude and longitude. The current location may further include altitude. In this way, the sub-control unit 190 calculates the current location using technology such as DR, PDR, and PNS and provides an LBS function based on the current location.

When location compensation is necessary or the electronic device approaches a designated position, the sub-control unit 190 may send an interrupt signal to the main control unit 190 in the active mode. (A similar interrupt signal may be sent in the sleep mode, albeit to interrupt a low level process running in the sleep mode.) For example, if it is determined that the location error is equal to or greater than a predetermined threshold value, the sub-control unit 190 generates a wakeup signal or interrupt to the main control unit 110. If it is determined that device 100 enters the coverage area of an access point or approaches a position where an article to buy is located, the sub-control unit 190 sends the main control unit 110 the wakeup signal or interrupt signal to perform a data offloading function or to notify the user of the approach to the designated position.

In FIG. 2, the main and sub-control units 110 and 190 share the storage unit 120 in common; however, in alternative embodiments, device 100 may include a first storage for the main control unit 110 and a second storage for the sub-control unit 190. The main and sub-control units 110 and 190 are shown implemented separately. Alternatively, the main and sub-control units 110 and 190 may be integrated into one chip. The power supply to the main and sub-control units 110 and 190 may be managed separately. In a further variation, the location information reception unit 175 and the WLAN communication unit 180 may be connected to the sub-control unit 190 in addition to the connection shown to the main control unit 110.

Although not shown in FIG. 2, device 100 may include supplementary function components such as a broadcast reception module, a digital audio source playback module such as MP2 module, and a camera module for taking still and motion pictures selectively. Although it is difficult to enumerate all of the functional components that can be converged in various manners according to the trend of digital convergence, device 100 according to an embodiment of the present invention may further include the aforementioned components and their equivalent devices.

FIG. 3 is a signal flow diagram illustrating an LBS-based data offloading procedure according to an embodiment of the present invention. At the outset, in operation 301 the main control unit 110 of device 100 receives zone information by means of the cellular communication unit 170 and receives location information—i.e., information of the current location of device 100—by means of the location information reception unit 175. The zone information is received from the base station 300 when device 100 enters the service area of the base station and may include coordinate information on the access points deployed within the service area, and service zone boundaries or the like of the respective access points.

The main control unit 110 may detect the sleep mode entry request at operation 303. In response, main control unit 110 may power on the sub-control unit 190 at operation 305 and the sensing unit 150 at operation 307.

The main control unit 110 may store the location information and zone information in the storage unit 120 at operation 309 and enters the sleep mode at operation 311.

The sub-control unit 190 requests the storage unit 120 for the location information and the zone information at operation 313 and receives the location information and the zone information from the storage unit 120 at operation 315.

The sub-control unit 190 may receive the sensor information from the sensing unit 150 at operation 317. At operation 319, the sub-control unit 190 may calculate the current location of device 100 using the sensor information and the location information obtained previously at operation 315. For this calculation, the sub-control unit 190 may use at least one of DR, PDR, and PNS techniques.

With the current location of device 100 thus computed, the sub-control unit 190 determines whether there is a location compensation request or detection of entry to a designated area at operation 321. (The sub-control unit 190 may determine whether the location information compensation is required by determining whether movement distance of the electronic device is equal to or greater than a predetermined distance, or, elapsed time from entry of the sleep mode, i.e., "movement time of the electronic device", is equal to or greater than a predetermined time.) If there is neither location compensation request nor detection of entry to the designated area at operation 321, the sub-control unit 190 returns the procedure to operation 317. Otherwise if there is location compensation request or detection of entry to the designated area at operation 321, the sub-control unit 190 wakes up the main control unit 110 at operation 323.

After the wakeup, the main control unit 110 may check the reason for the wakeup at operation 325. For example, the main control unit 110 may check whether it has woken up for the location compensation request or the detection of entry to the designated area. If it has awoken for the location compensation request at operation 325, the main control unit 110 may request the location information reception unit 175 for location information at operation 327. Otherwise if it has awoken for the detection of entry to the designated area, the main control unit 110 powers on the WLAN communication unit 180 at operation 329. If the WLAN communication unit 180 is powered on, device 100 may establish a data communication channel with the access point to support the data offloading.

Although the above description is directed to the case where the electronic device is operating in the sleep mode, the present invention is not limited thereto. For example, device 100 in the active mode also may collect the sensor information by means of the sensing unit 150 and provide LBS function (e.g. location compensation and data offloading) based on the collected sensor information. These operations may serve to reduce power consumption in the active mode by reducing power otherwise consumed for conventional operations in providing LBS.

Figure 4B:
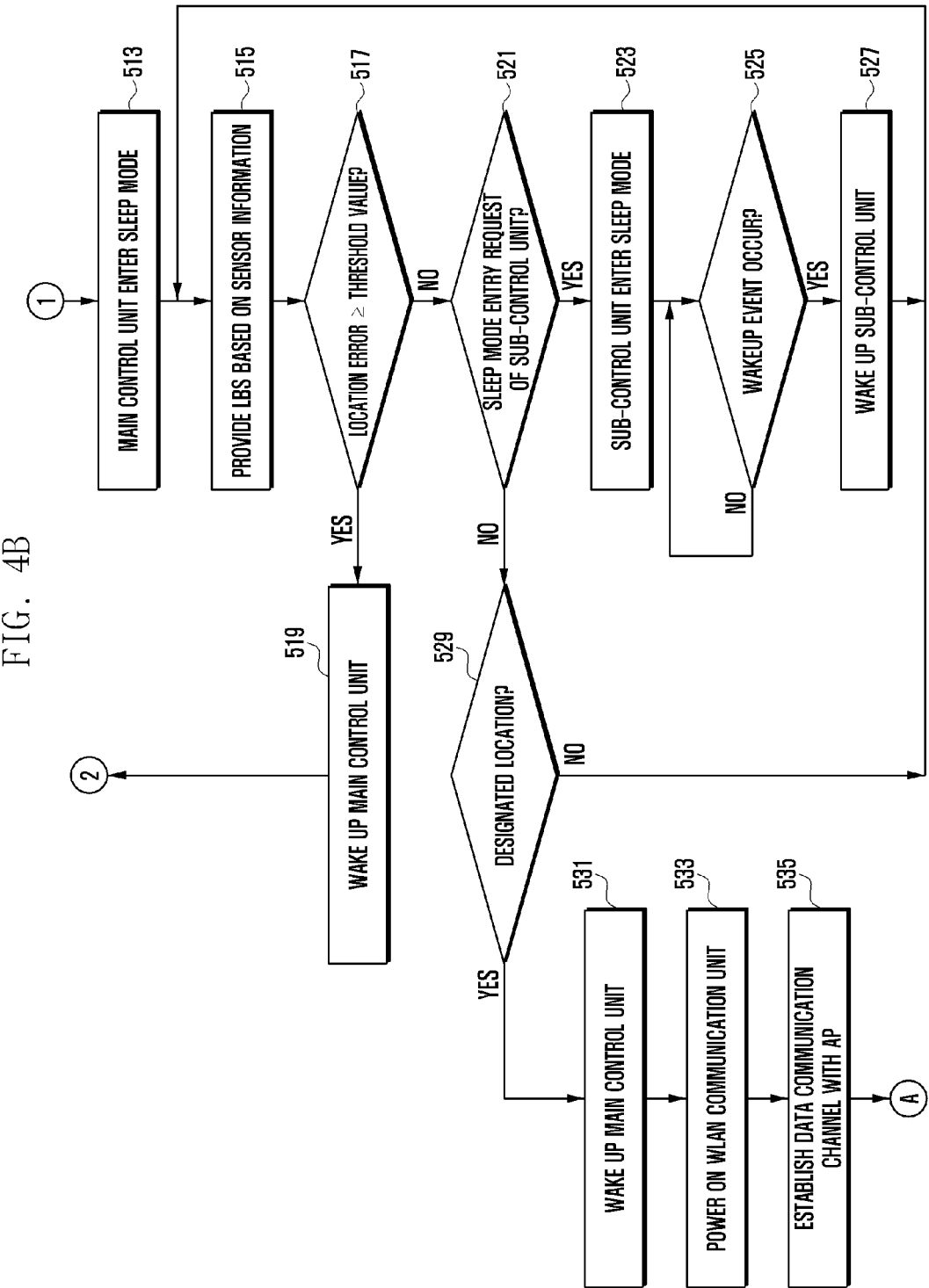

FIGS. 4A and 4B are portions of a common flowchart illustrating an LBS provision method of an electronic device according to an embodiment of the present invention. At an initial operation 501, main control unit 110 of device 100 determines whether an LBS function is in an activated state ("on"). If the LBS function is in a deactivated state ("off"), the main control unit 110 performs a scheduled function at operation 503. For example, the main control unit 110 may perform a music playback function or camera function in response to a user request, or stay in the idle state. Otherwise if the LBS function is on, the main control unit 110 may activate the location information reception unit 175 at operation 505.

The main control unit 110 may provide the LBS function based on the location information received by the location information reception unit 175 at operation 507. The sub-control unit 190 may receive the sensor information from the sensing unit 150 and provide the LBS function based on the collected sensor information. For example, the sub-control unit 190 may calculate the location of device 100 based on the sensor information and, if location compensation is necessary, generates an interrupt signal requesting for location compensation to the main control unit 110. When device 100 enters the designated area, the sub-control unit 190 also may generate an interrupt signal to the main control unit 110 to notify of the entry to the designated area.

The main control unit 110 may determine whether a sleep mode entry request is detected at operation 509. The sleep mode entry request may be issued when a predetermined condition is fulfilled. For example, if there is no input during a predetermined period (e.g. 10 seconds) or if a sleep mode entry key input is detected, the sleep mode entry request is issued.

If the sleep mode entry request is detected at operation 509, the main control unit 110 powers on the sub-control unit 190 and the sensing unit 150 at operation 511. Then the main control unit 110 may enter the sleep mode at operation 513.

Next, the sub-control unit 190 may calculate the location of the electronic device based on the sensor information received from the sensing unit 150 and provide the LBS function at operation 515.

The sub-control unit 190 may determine whether the location error is equal to or greater than a predetermined threshold value (e.g. 5 M) at operation 517. Whether the location error is equal to or greater than the threshold value may be determined using at least one of the time and movement distance. Typically, in the case of providing the location information based on the sensor information, there is always an error which increases as time elapses. Accordingly, if time has elapsed since the sensing unit-assisted location calculation, the sub-control unit 190 determines that location error is equal to or greater than the threshold value. The error may increase as the movement distance increases. Accordingly, the sub-control unit 190 may calculate the movement distance based on the change of the location and determine, if the movement distance is equal to or greater than a predetermined distance (e.g. 10 M), that the location error is equal to or greater than the threshold value. The sub-control unit 190 may determine whether the location error is equal to or greater than the threshold value in consideration of both the elapsed time and movement distance.

If the location error is equal to or greater than the threshold value at operation 517, the sub-control unit 190 may wake up the main control unit 110 at operation 519. Once it has awakened, the main control unit 110 may return the procedure to operation 505. For example, the main control unit 110 powers on the location information reception unit 175 to compensate the location information and, if the location information is compensated completely, enters back to the sleep mode.

Otherwise if the location error is less than the threshold value at operation 517, the sub-control unit 190 determines whether a sleep mode entry request is detected at operation 521. If a sleep mode entry request is detected at operation 521, the sub-control unit 190 may enter the sleep mode at operation 523. If the sub-control unit 190 enters the sleep mode, the sensor information collected by the sensing unit 150 may be stored in the storage unit 120.

The sub-control unit 190 may determine whether a wakeup event is detected at operation 525. The wakeup event may occur when a predetermined time has elapsed, when the sensor information storage space runs short, and when the sensor information changes abruptly. The wakeup event may occur in the form of an interrupt.

If no wakeup event is detected, the sub-control unit 190 may repeat operation 525. Otherwise if the wakeup event is detected, the sub-control unit 190 wakes up at operation 527. At this time, the sub-control unit 190 may calculate current location using the sensor information stored in the storage unit 120 and location information before the entry to the sleep mode. The sub-control unit 190 also may delete the stored sensor information. Afterward, the sub-control unit 190 may provide the LBS function at operation 515.

If no sleep mode entry request is received at operation 521, the sub-control unit 190 determines whether the current location is the designated location at operation 529. The designated location may be the location where the access point is installed. If the current location is not the designated location at operation 529, the sub-control unit 190 returns the procedure to operation 515. Otherwise if the current location is the designated location at operation 529, the sub-control unit 190 wakes up the main control unit 110 at operation 531. Afterward, the main control unit 110 powers on the WLAN communication unit 175 at operation 533 and establishes a data communication channel with the access point at operation 535.

If no sleep mode entry request is detected at operation 509, the main control unit 110 determines whether the LBS function is powered off at operation 537. If the LBS function is powered on, the main control unit 110 returns the procedure to operation 507. Otherwise if the LBS function is powered off, the main control unit 110 may terminate the LBS provision procedure.

Meanwhile, if the location information reception unit 170, e.g. GPS module, may be able to calculate the location (coordinates), operation 519 may be omitted. That is, when location compensation is required, the sub-control unit 190 may compensate the location information by powering on the GPS module without wakeup of the main control unit 110.

Also, operations 523 to 527 may be omitted. For example, the sub-control unit 190 may not enter the sleep mode in the state of providing the LBS function. This is because if the sub-control unit 190 enters the sleep mode it is impossible to provide the LBS function for the change of the location of device 100.

If the designated location is the position where an item included in the purchase list is located at operation 529, operations 533 and 535 may be of outputting an alarm message sound effect.

If device 100 is at an outdoor location, the location information reception unit 170 may receive the location information from the GPS module. If device 100 is at an indoor location, the location reception unit 170 may check (calculate) the location using Wi-Fi Positioning System (WPS) technology.

Figure 5:
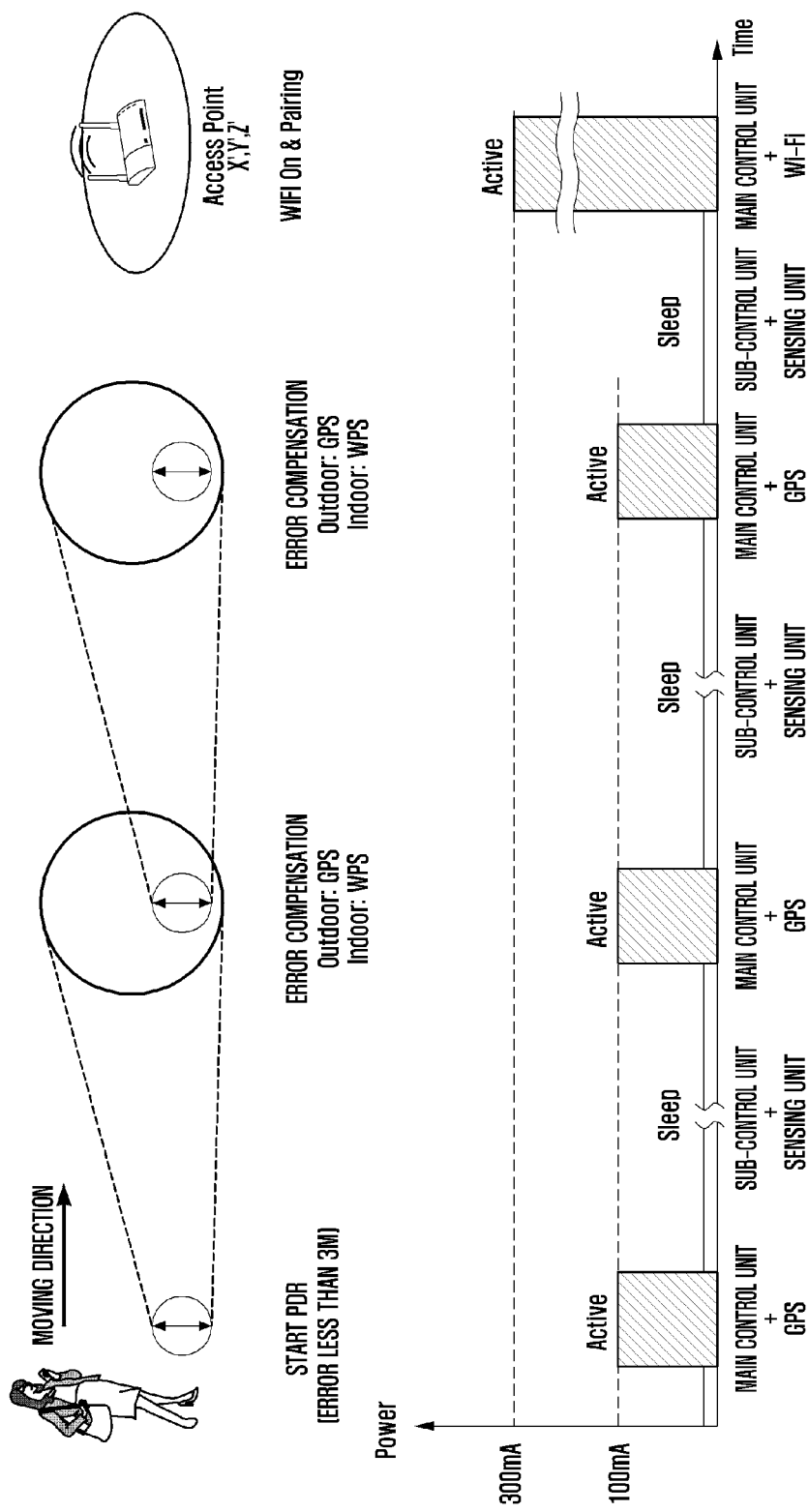
FIG. 5 is a diagram illustrating change of the electric current consumption of the electronic device according to an embodiment of the present invention.

FIG. 5 is a diagram illustrating change of the electric current consumption of the electronic device 100 configured according to an embodiment.

As shown in FIG. 5, in the case that the location information is received by means of the GPS module, e.g. the main control unit and the GPS module are powered on, device 100 may consume electric current of about 100 mA.

Afterward, if a sleep mode entry request is detected, the main control unit 110 of device 100 enters the sleep mode and the GPS module is powered off. At this time, the electric current consumption of device 100 is very low, since only the sub-control unit 190 and sensing unit 150 are powered on.

Meanwhile, if a location error compensation request is detected, the main control unit 110 of device 100 wakes up and the GPS module powers on. At this time, device 100 may again consume current of about 100 mA. This example refers to the case where the GPS module is activated. In the indoor environment, device 100 may activate the Wi-Fi communication module, which typically draws more current.

If device 100 enters the service area of an access point, the main control unit 110 of device 100 and the Wi-Fi communication module wake up to establish a data communication channel. At this time, the current consumption of device 100 may increase to about 300 mA. This is because device 100 communicates data with the access point for establishing the data communication channel.

According to an embodiment of the present invention, device 100 activates the sub-control unit and the sensing unit including various sensors in the sleep mode and calculates the location of device 100 using one of DR, PDR, and PNS techniques. In this way, device 100 is capable of minimizing power consumption. When a predetermined condition is fulfilled, device 100 wakes up the main control unit to compensate the location information. As a consequence, device according to an embodiment of the present invention is capable of providing the LBS function constantly even in the sleep mode, resulting in the provision of accurate location information. When it enters a service area of an access point, the electronic device turns on the Wi-Fi module automatically to establish a data communication channel with the access point for supporting a data offloading function.

As described above, the LBS provision method and system of the present invention is advantageous in that an electronic device continually provides LBS in the sleep mode using a low power processor and a sensor while minimizing power consumption.

Also, the LBS provision method and system of the present invention is advantageous in terms of supporting a data offloading service using LBS. For example, when the electronic device in data communication with a base station enters a coverage area of an Access point, it activates a Wireless Local Area Network (WLAN) communication module to establish a data communication channel with the access point, resulting in reduction of network traffic load of the base station.

The above-described LBS provision method of an electronic device according to an embodiment of the present invention can be implemented using computer-executable program commands stored in a computer-readable storage medium. The computer readable storage medium may store the program commands, data files, and data structures in individual or combined forms. The program commands recorded in the storage medium may be designed and implemented for various exemplary embodiments of the present invention or used by those skilled in the computer software field. Examples of a computer-readable storage medium include magnetic media such as a floppy disk and a magnetic tape, optical media including a Compact Disc (CD) ROM and a Digital Video Disc (DVD) ROM, a magneto-optical media such as a floptical disk, and the hardware device designed for storing and executing program commands such as ROM, RAM, and flash memory. Examples of program commands include language code executable by computers using an interpreter as well as machine language codes created by a compiler. The aforementioned hardware device can be implemented with one or more software modules for executing the operations of the various exemplary embodiments of the present invention.

Although various embodiments of the present invention have been described using specific terms, the specification and drawings are to be regarded in an illustrative rather than a restrictive sense in order to help understand the present invention. It is apparent to those skilled in the art that various modifications and changes can be made thereto without departing from the broader spirit and scope of the invention.

What is claimed is:

1. A location-based service provision method of an electronic device, the method comprising:
   operating a main control unit of the electronic device in at least an active mode;
   operating a low power sub-control unit and a sensing unit of the electronic device in at least one of a sleep mode and the active mode;
   collecting, at the sub-control unit, sensor information provided by the sensing unit of the electronic device, for measuring movement of the electronic device while the main control unit is in at least the sleep mode;
   calculating, at the sub-control unit, first location information of the electronic device based at least on the sensor information;
   providing, by the sub-control unit, the location-based service based on the calculated first location information;
   determining whether a location information compensation is required;
   transmitting, when the location information compensation is required, a wake-up signal or an interrupt signal to the main control unit;
   receiving, at the main control unit, second location information by activating a location information reception unit; and
   compensating the calculated first location information using the second location information.

2. The method of claim 1, wherein the receiving of the second location information comprises:
   receiving, when the electronic device is in an outdoor environment, the second location information through a Global Positioning System (GPS) module; and calculating, when the electronic device is in an area incapable of receiving a GPS signal, the second location information using a wireless fidelity (Wi-Fi) Positioning System (WPS).

3. The method of claim 1, wherein the determining of whether the location information compensation is required comprises at least one of:
   determining, at the sub-control unit, whether movement distance of the electronic device is equal to or greater than a predetermined distance; and
   determining whether movement time of the electronic device is equal to or greater than a predetermined time.

4. The method of claim 1, further comprising:
   determining whether the calculated first location information matches a designated location; and
   notifying, when the calculated first location information matches the designated location, the main control unit of the match by transmitting a wakeup or interrupt signal.

5. The method of claim 4, wherein the determining of whether the calculated first location information matches the designated location comprises:
   receiving supplementary information including article location information from an access point;
   determining whether the designated location matches a location of an article which is included in a predetermined purchase list; and
   outputting, when the designated location matches the location of the article, at least one of an alarm message and a sound effect.

6. The method of claim 1, further comprising:
   receiving, at the main control unit, zone information including location information of an access point from a base station;
   determining, at the sub-control unit, whether the calculated first location information is near a location of the access point included in the zone information; and
   transmitting, when the calculated first location information is near the location of the access point, a wakeup signal or an interrupt signal to the main control unit to control a Wireless Local Area Network (WLAN) communication unit to establish a data communication channel with the access point.

7. An electronic device comprising:
   a main control unit which transitions, when a predetermined condition is fulfilled, from an active mode to a sleep mode;
   a sensing unit which collects sensor information for use in measurement of movement of the electronic device in at least the sleep mode of the main control unit; and
   a low power sub-control unit which calculates first location information based on the collected sensor information, provides a location-based service based on the calculated first location information while the main control unit is in at least the sleep mode,
   wherein the sub-control unit transmits, when location information compensation is required, a wakeup signal or an interrupt signal to the main control unit, and
   wherein the main control unit, upon receipt of the wakeup signal or the interrupt signal, receives second location information from a location information reception unit, and compensates the calculated first location information using the received second location information.

8. The electronic device of claim 7, wherein the main control unit receives, when the electronic device is in an outdoor environment, the second location information through a Global Positioning System (GPS) module and calculates, when the electronic device is in an area incapable of receiving GPS signal, the second location information using a wireless fidelity (Wi-Fi) Positioning System (WPS).

9. The electronic device of claim 7, wherein the sub-control unit determines whether the location information compensation is required by determining at least one of whether movement distance of the electronic device is equal to or greater than a predetermined distance and whether movement time of the electronic device is equal to or greater than a predetermined time.

10. The electronic device of claim 7, wherein the sub-control unit determines whether the calculated location matches a designated location and notifies, when the calculated location matches the designated location, the main control unit of the match by transmitting a wakeup or interrupt signal.

11. The electronic device of claim 10, wherein the sub-control unit receives supplementary information including article location information from an access point, determines whether the designated location matches a location of an article which is included in a predetermined purchase list, and outputs, when the designated location matches the location of the article, at least one of an alarm message and a sound effect.

12. The electronic device of claim 7, wherein the main control unit receives zone information including location information of an access point from a base station, and the sub-control unit determines whether the calculated location is near a location of the access point included in the zone information and transmits, when the calculated location is near the location of the access point, a wakeup signal or an interrupt signal to the main control unit to control a Wireless Local Area Network (WLAN) communication unit to establish a data communication channel with the access point.

13. A system for providing a location-based service, the system comprising:
   a base station which transmits zone information including location information of at least one access point within a service area of the base station;
   at least one access point deployed within the service area of the base station; and
   an electronic device which:
      receives the zone information from the base station by means of a main control unit of the electronic device,
      calculates first location information of the electronic device by means of a low power sub-control unit of the electronic device based on sensor information collected by a sensing unit while the main control unit is in at least a sleep mode, and
      establishes, when the electronic device enters a service area of a first access point of the at least one access point, a data communication channel with the first access point by means of the low power sub-control unit,
   wherein the electronic device further includes a location information reception unit that receives second location information of the electronic device,
   wherein the sub-control unit transmits, when location information compensation is required, a wakeup signal or an interrupt signal to the main control unit, and
   wherein the main control unit, upon receipt of the wakeup signal or the interrupt signal, receives second location information from the location information reception unit, and compensates the calculated first location information using the received second location information.

14. The system of claim 13, wherein the sub-control unit and the sensing unit are activated by the main control unit upon the electronic device entering a sleep mode.

15. The system of claim 14, wherein the electronic device further includes a location information reception unit that receives second location information of the electronic device, the second location information being provided to the sub-control unit when the electronic device enters the sleep mode, and the sub-control unit performs the calculation of the first location information in the sleep mode based on the second location information and a movement measurement of the electronic device based on movement information collected by the sensing unit.

16. The system of claim 15, wherein the movement measurement is performed using a Dead-Reckoning, Pedestrian Dead-Reckoning or a Pedestrian Navigation System calculation.

* * * * *